United States Patent
Chen

(10) Patent No.: US 9,971,123 B2
(45) Date of Patent: May 15, 2018

(54) TOP-CONTACTED REFLECTIVE SHEET DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 64 days.

(21) Appl. No.: 15/154,203

(22) Filed: May 13, 2016

(65) Prior Publication Data

US 2017/0329101 A1 Nov. 16, 2017

(51) Int. Cl.
*G02B 7/182* (2006.01)
*G02B 5/08* (2006.01)
*B60K 37/00* (2006.01)

(52) U.S. Cl.
CPC ............ *G02B 7/1825* (2013.01); *B60K 37/00* (2013.01); *B60K 2350/2004* (2013.01)

(58) Field of Classification Search
CPC ........ G02B 7/182; G02B 5/08; G02B 7/1825; B60R 1/06; B60R 1/04; B60R 1/02; B60R 2001/1215; B60R 2011/0026; B60K 37/00; B60K 35/00; B60K 2350/2052; B60K 2350/1076; B60K 2350/1072; B60K 2350/2004; B60K 2350/102; B60K 2350/40
USPC ........ 359/873, 841, 843, 844, 871, 872, 875
See application file for complete search history.

(56) References Cited

U.S. PATENT DOCUMENTS

| | | | |
|---|---|---|---|
| 6,547,410 B1* | 4/2003 | Pederson | B60Q 1/2611 362/272 |
| 2002/0167189 A1* | 11/2002 | Nakamura | B62D 33/0273 296/57.1 |
| 2014/0153123 A1* | 6/2014 | Hancock | B60R 1/06 359/872 |

* cited by examiner

*Primary Examiner* — Jade R Chwasz
(74) *Attorney, Agent, or Firm* — Guice Patents PLLC

(57) ABSTRACT

The present invention relates to a top-contacted reflective sheet device, which is consisted of a base, a reflective sheet and a shaft group, and an angle adjustment module is further included. By the composition of above elements, a level and a flip angle of the reflective sheet is provided to be adjusted easily, and a top end of the reflective sheet could be fixed on a windshield of a vehicle to thereby remove shakes, so that a user may easily adjust the direction of the reflective sheet to obtain an optimal viewing angle, to thereby improve driving safety.

16 Claims, 5 Drawing Sheets

TOP-CONTACTED REFLECTIVE SHEET DEVICE

BACKGROUND OF THE INVENTION a) Field of the Invention

The present invention relates to a top-contacted reflective sheet device and, more particularly, to a reflective sheet device of a head-up display device for easily adjusting a direction of a reflective sheet, and a top end of the reflective sheet could be fixed on a windshield of a vehicle to thereby remove shakes, so that a user may easily adjust the direction of the reflective sheet to obtain an optimal viewing angle, to thereby improve driving safety.

b) Description of Prior Art

The head-up display device is from the aviation technology originally. The head-up display device may directly project messages in front of the cockpit, and pilots may conveniently obtain desired messages without lowering head to check the messages on the instrument board, pilots can easily combine the messages displayed by the head-up display with the outside scene. Since the image reflected into eyes and the central axis of the aircraft is balanced, the height of pilots may not cause error on pitch angles or visual aim. Therefore, the purpose of the head-up display is that pilots may always keep the head-up posture without lowering head to check the messages displayed on the instrument board, to reduce ignoring the rapid change in the external environment during the interval between lowering head and heading-up, and avoid the delay and discomfort due to eyes focal length is adjusted continuously.

It is one of the biggest main reasons of car accidents that drivers' line of sight is away from the front road when driving. In order to reduce the frequency and duration that drivers' line of sight away from the front road, some car manufacturers equip this kind of head-up display inside the luxury cars, thus, the drivers know the information, such as car speed and engine speed, without moving line of sight away from the front windshield, to maintain traffic safety.

In general driving condition, the shortest time of moving the line of sight away from the front road for reading the information displayed on the instrument board is 0.5 second. For the condition of highway speed of 100 km per hour, the car travels 30 meters per second, and the risk is increased when there are a lot of cars on the road. For safety, the car manufacturers may equip the head-up display in some cars to reduce the distraction of drivers, and the head-up display is used as marking practices to attract consumers.

Recently, the technique of the head-up displays used in the cars is less complicated than the head-up displays equipped in aircrafts. It is one kind of optical system, and generally it is consisted of two main equipments, which are a projector and a combiner. The projector is consisted of signal light sources, projection lens and other optical components. The signal light source of the projector is consisted of LCD monitors or CRT equipments. Light is emitted from the signal light source and projected to the combiner on the glass (or a special transparent screen) by the projector, and the combiner displays words or images.

In the recent years, there are many head-up displays for installation in car in the market. These head-up displays may simply display car speed and engine speed, now display water temperature, throttle position, fuel, over-speed warning, reverse image, battery voltage, and even combine the speed radar. Some products are stressed as quick installation, which are just connected to the car PC without using other cables. In the luxury cars of some car manufacturers, the information of the navigation system, front and rear vehicle distance is added into the information displayed by the head-up display, which is increased a lot of convenience for drivers. Besides, the external head-up displays in the market is various, and the prices are from several hundred dollars for simple function ones, to ten thousand dollars for good quality and versatile ones.

The related technology may be referred to the cited references TW patent number M516293, M497113, M510866, 1509287, M514078, M515111, 1518369, M462692, and TW publication number 201534499, 201432311, 201537220.

The above cited references have already disclosed the feature of related head-up display devices, but there are the following drawbacks exist in use:

1. For after market, the space on the dashboard is not enough for installing the head-up display device because the volume needed by the light path is too large that may obstruct the line of sight of users.

2. For solving the problem that the volume needed by the light path is too large, another method is using a separate way for this structure, namely, the display screen is fixed on an upper portion of the windshield and the reflective sheet is fixed on the dashboard. However, in many vehicles, the dashboard may shake due to operation of an engine or an air-conditioning compressor, this kind of shake may let the reflective sheet fixed above shake together, and displacement of shakes may be enlarged at the magnification due to the magnification effect of the concave mirror, so that the display screen may be shaken severely.

3. Recently, head-up display devices installed in vehicles, whether they are equipped originally or installed externally, there are some problems in use. In above cited references, although the drawback that light path is too large has already solved by some of them, adjustment of the visual angle and maintenance of stability of the reflective sheet of head-up display devices are generally neglected. Even though some cited references have already disclosed adjustable structures, the structures are complicated and consisted of many elements, and the shaking problem could not be easily solved because the reflective sheets have not included stable and effective supports, so that viewing effect of display device may directly be affected for users.

SUMMARY OF THE INVENTION

In view of the drawbacks of the conventional ones, the inventor finally completed the top-contacted reflective sheet device of the present invention after numerous improvements, namely, the object of the present invention is to provide a top-contacted reflective sheet device of a head-up display device for easily adjusting a visual angle, and a top end of the reflective sheet could be fixed on a windshield of a vehicle to thereby remove shakes, so that a user may obtain an optimal viewing angle, to thereby improve driving safety.

To achieve the object, the top-contacted reflective sheet device of the present invention, including:

a base, a first rotary sleeve is set on its one side;

a reflective sheet, an assembled portion is set on its one side, the assembled portion is provided to fix to the first rotary sleeve, a top end of the reflective sheet is touched to a windshield;

a shaft group, which is set between the base and the first rotary sleeve.

The top-contacted reflective sheet device of the present invention further includes an angle adjustment module, the angle adjustment module is set on a rear portion of the base, the base is correspondingly moved by adjusting the angle adjustment module, to thereby let the top of the reflective sheet be located in the location of touching the windshield after the reflective sheet is flipped.

The top-contacted reflective sheet device of the present invention further includes a damper, a second fixing hole and a second rotary sleeve are set on another side of the base, the damper is set between the base and the second rotary sleeve.

The top-contacted reflective sheet device of the present invention further includes a leveling base, the leveling base is set under an angle adjustment module, a magnetic element is set on the leveling base, a ferromagnetic element is correspondingly set on a bottom of the angle adjustment module.

The top-contacted reflective sheet device of the present invention further includes an fastening module, an engaging element and an embedded element are set on the fastening module, the engaging element is set on the assembled portion of the reflective sheet, the embedded element is fixed on the base, the engaging element is engaged with the embedded element.

The reflective sheet, a damping block is set on its top end, shakes of the reflective sheet is reduced due to elastic shock absorption of the damping block.

A shaft hole is set on the base, a first fixing hole is set on a side of the base, the shaft group includes a fixed shaft and a first elastic element, the fixed shaft is inserted into the shaft hole, an end of the fixed shaft is fixed into the first fixing hole and slipped on the first rotary sleeve, the first elastic element is slipped on the fixed shaft.

The top-contacted reflective sheet device of the present invention further includes a top-contacted sheet, a side of the top-contacted sheet is stuck on the windshield.

The angle adjustment module includes an adjustment block, an angle adjustment knob and a plate, an adjustment hole is set on the adjustment block, the angle adjustment knob is inserted into the adjustment hole.

The adjustment module further includes a second elastic element, an adjusting plate and a fixed column, the adjusting plate is combined with the base, the second elastic element is slipped on the fixed column, an end of the second elastic element is touched the plate, and another end is touched the adjusting plate.

The top-contacted sheet is made of a translucent material.

DETAILED DESCRIPTION OF THE INVENTION

Figure 1:
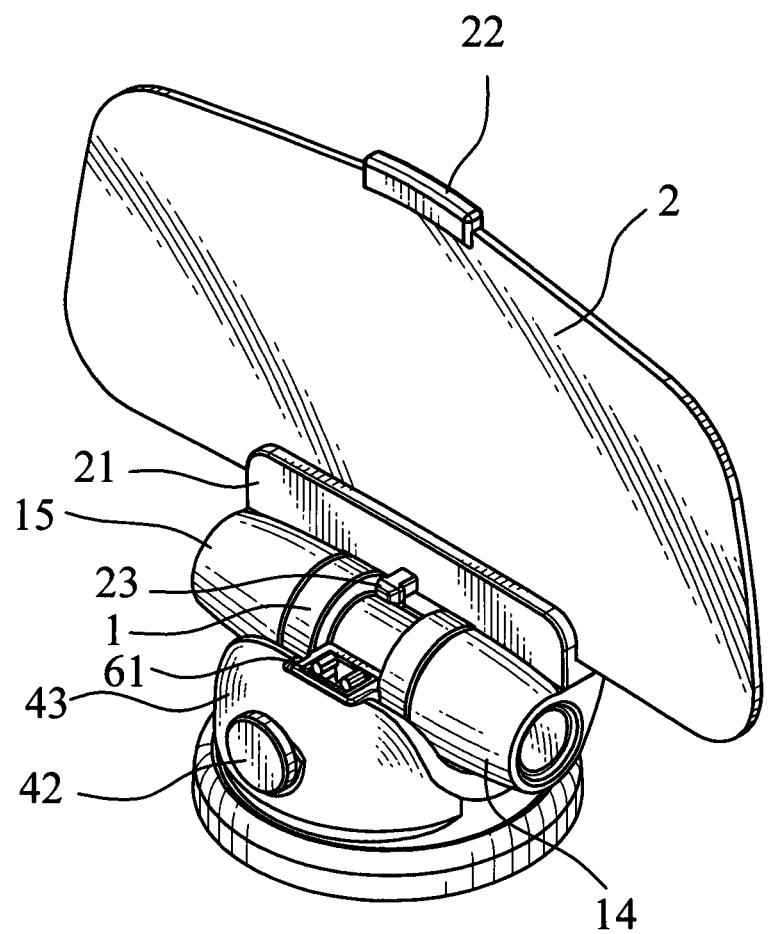
FIG. 1 is a three-dimensional schematic diagram of the present invention.

Please refer to FIGS. 1 to 5, which is the top-contacted reflective sheer of the present invention, including:

a base 1, a first fixing hole 11 and a second fixing hole 12 are respectively set on its two sides, a shaft hole 13 is set between the first fixing hole 11 and the second fixing hole 12, a first rotary sleeve 14 is set on a side of the base 1, a second rotary sleeve 15 is set on another side of the base 1;

a reflective sheet 2, an assembled portion 21 is set on its one side, the assembled portion 21 is provided to fix to the first rotary sleeve 14 and the second rotary sleeve 15, a top end of the reflective sheet 2 is touched to a windshield D;

a shaft group 3, which is set between the base 1 and the first rotary sleeve 14, the shaft group 3 includes a fixed haft 31 and a first elastic element 32, the first elastic element 32 is a torsion spring, the fixed shaft 31 is inserted into the shaft hole 13, two longitudinal holes 131 set on an inner peripheral edge of the shaft hole 13 are provided for two bolts B to pass through and fastened to two corresponding inner thread holes 312 on the fixed shaft 31, an end of the fixed shaft 31 is fixed to the first fixing hole 11 and slipped on the first fitting hole 141 of the first rotary sleeve 14, the first elastic element 32 is slipped on the fixed shaft 31, the first fixed end 321 of the first elastic element 32 is set on the first positioning groove 142 of the first rotary sleeve 14, the second fixed end 322 of the first elastic element 32 is set on a third positioning groove 311 on an end of the fixed shaft 31.

The top-contacted reflective sheet device of the present invention further includes an angle adjustment module 4, the angle adjustment module 4 includes an adjustment block 42, an angle adjustment knob 42 and a plate 43, the adjustment block 41 of the angle adjustment module 4 is set on a rear portion of the base 1. An adjustment hole 411 is set on the adjustment block 41, the adjustment hole 411 is an inner thread hole for an external thread section 421 of the angle adjustment knob 42 to insert into, the base 1 is correspondingly moved by rotating the angle adjustment knob 42, to thereby let the top of the reflective sheet 2 be fastened and located in the location of touching the windshield D after the reflective sheet 2 is flipped, to effectively reduce shakes.

The plate 43 is provided to fix to the bottom of the base 1, a through hole 431 is set on a side of the plate 43, the through hole 431 is provided for the external thread section 421 of the angle adjustment knob 42 to insert into, the plate 43 is a hollow base body.

The top-contacted reflective sheet device of the present invention further includes a damper 16, the damper 16 is set between a second fitting hole 151 of the second rotary sleeve 15 and the base 1, a third fixing hole 161 set on the damper 16 is provided for another end of the fixed shaft 31 to insert into, a rib 162 is set on a outer peripheral edge of the damper 16, the rib 162 is embedded into a second positioning groove 152 inside the second fitting hole 151. By installation of the damper 16, speed on two sides of the reflective sheet 2 may become the same when being flipped.

The reflective sheet 2, a damping block 22 is set on its top end, the damping block 22 is made by elastic materials, and shakes of the reflective sheet 2 is reduced due to elastic shock absorption of the damping block 22.

The top-contacted reflective sheet device of the present invention further includes a leveling base 5, the leveling base 5 is set under the angle adjustment module 4. A double-sided adhesive tape 50 could be attached on the bottom of the leveling base 5, and a side of the double-sided adhesive tape 50 is fixedly attached on a surface A of a dashboard under the windshield D. A magnetic element 51 is set on the leveling base 5, a ferromagnetic element 44 is correspondingly set on a bottom of the plate 43 of the angle adjustment module 4. By magnetic attraction of the magnetic element 51 and the ferromagnetic element 44, the leveling base 5 is provided to fix to the angle adjustment module 4. When a user wants to adjust horizontal viewing angle of the reflective sheet 2, he could only rotate the plate 43 horizontally by fingers and the horizontal angle of the reflective sheet 2 could be adjusted.

The top-contacted reflective sheet device of the present invention further includes an fastening module 6, the fastening module 6 is a conventional engaging element, an engaging element 23 and an embedded element 61 are set on the fastening module 6, the engaging element 23 is set on the assembled portion 21 of the reflective sheet 2, the embedded element 61 is fixed into a fixing groove 10 of the base 1. The reflective sheet 2 could be folded when not in use, the engaging element 23 and the embedded element 61 could be embedded together. At this time, the first elastic element 32 is in a compress state due to the folding force of the reflective sheet 2. When a user wants to use and presses the reflective sheet 2, the engaging element 23 and the embedded element 61 could be separated immediately, and the reflective sheet 2 is expanded upwards due to the restoring force of the first elastic element 32.

Figures 2, 3:
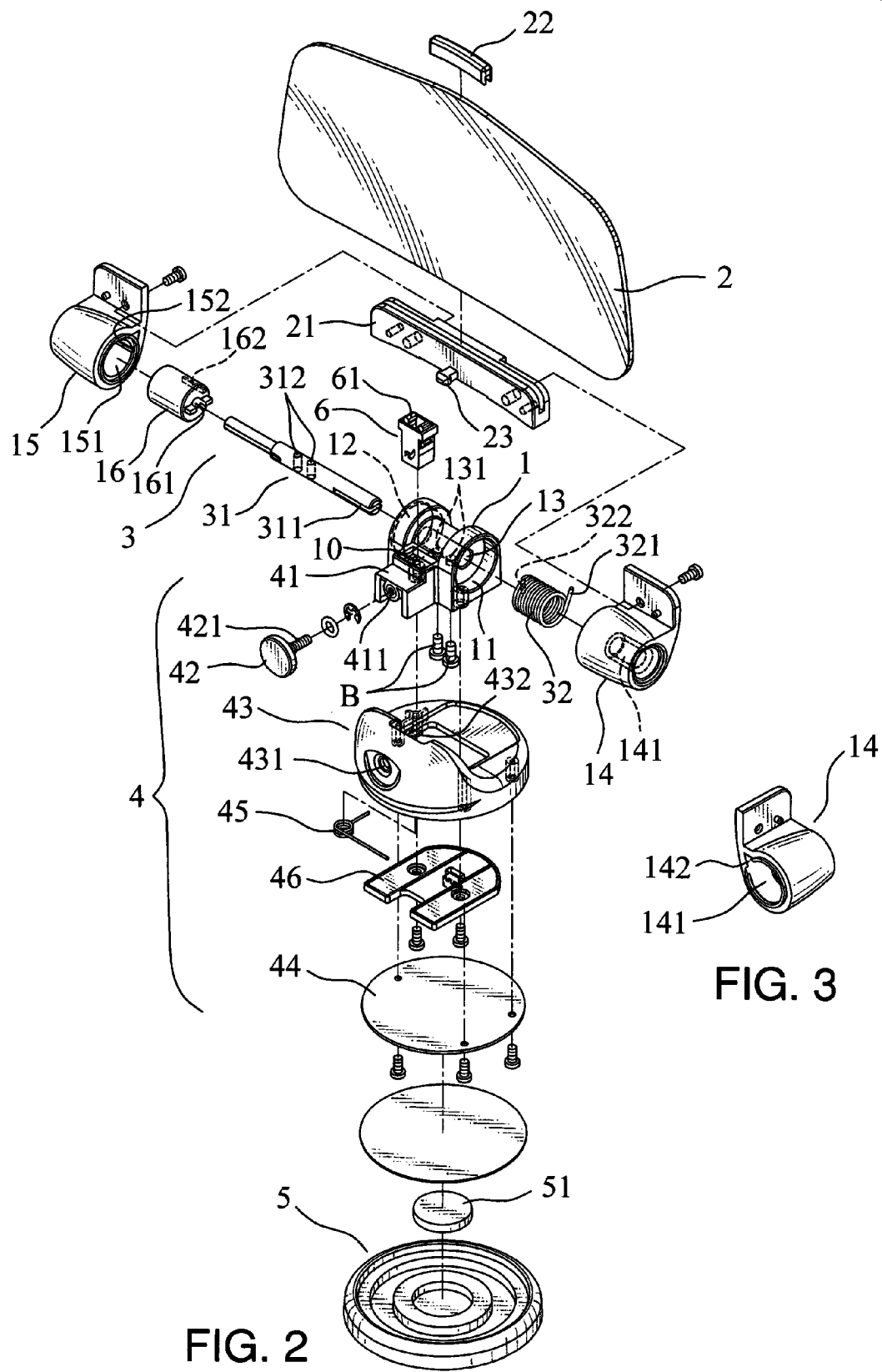
FIG. 2 is a three-dimensional exploded diagram of the present invention.
FIG. 3 is a three-dimensional schematic diagram of the first rotary sleeve of the present invention.
Figure 4:
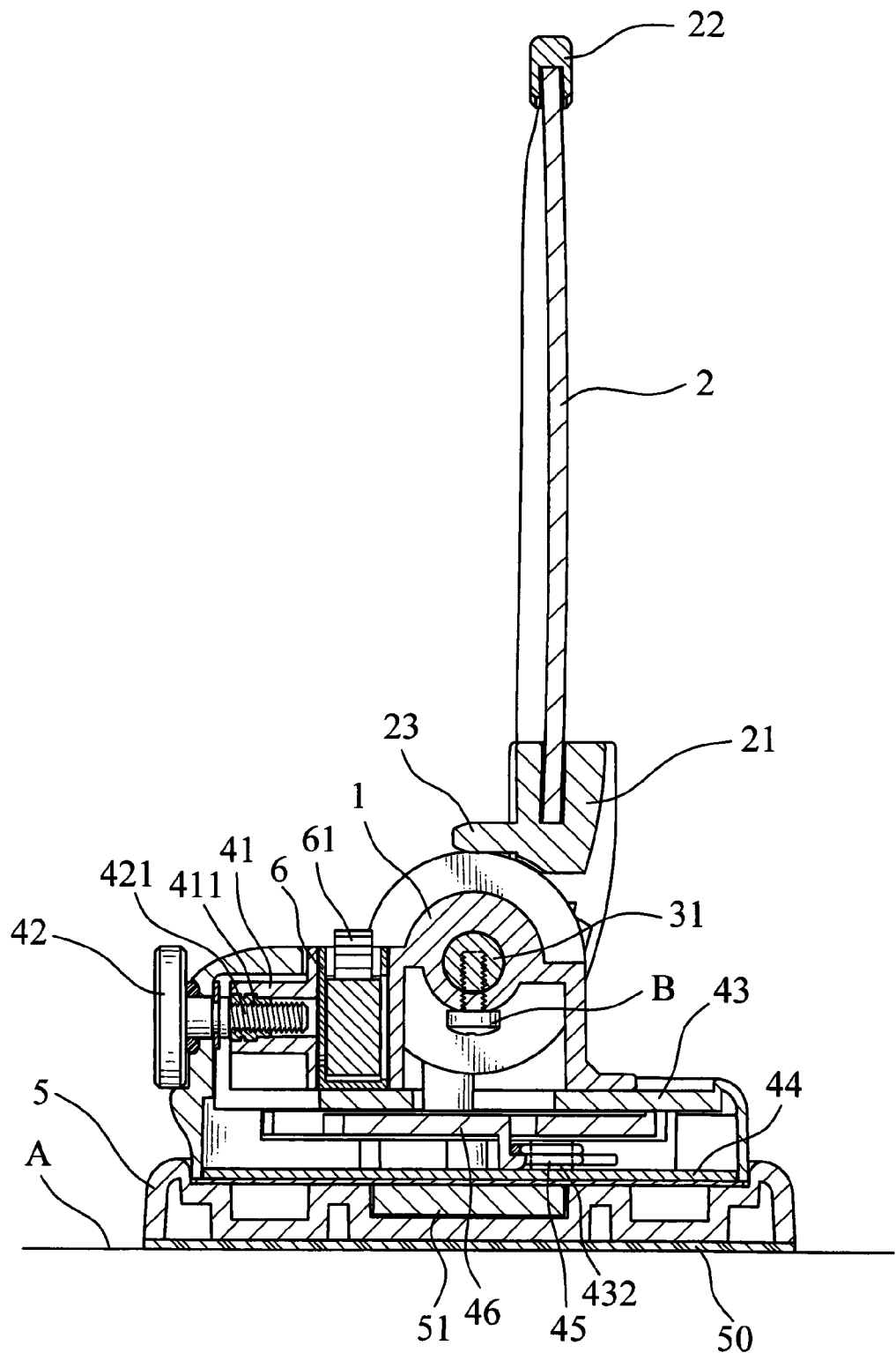
FIG. 4 is a cross-sectional schematic diagram of the present invention.

Please refer to FIG. 2 and FIG. 4, the adjustment module 4 further includes a second elastic element 45, an adjusting plate 46 and a fixed column 432, the adjusting plate 46 is combined with the base 1, the fixed column 432 is set inside the plate 43, the second elastic element 45 is a torsion spring, the second elastic element 45 is slipped on the fixed column 432, an end of the second elastic element 45 is touched the angle adjustment module 4, and another end is touched the adjusting plate 46, to thereby buffer external shock force, to effectively reduce shakes of the base 1.

Figure 5:
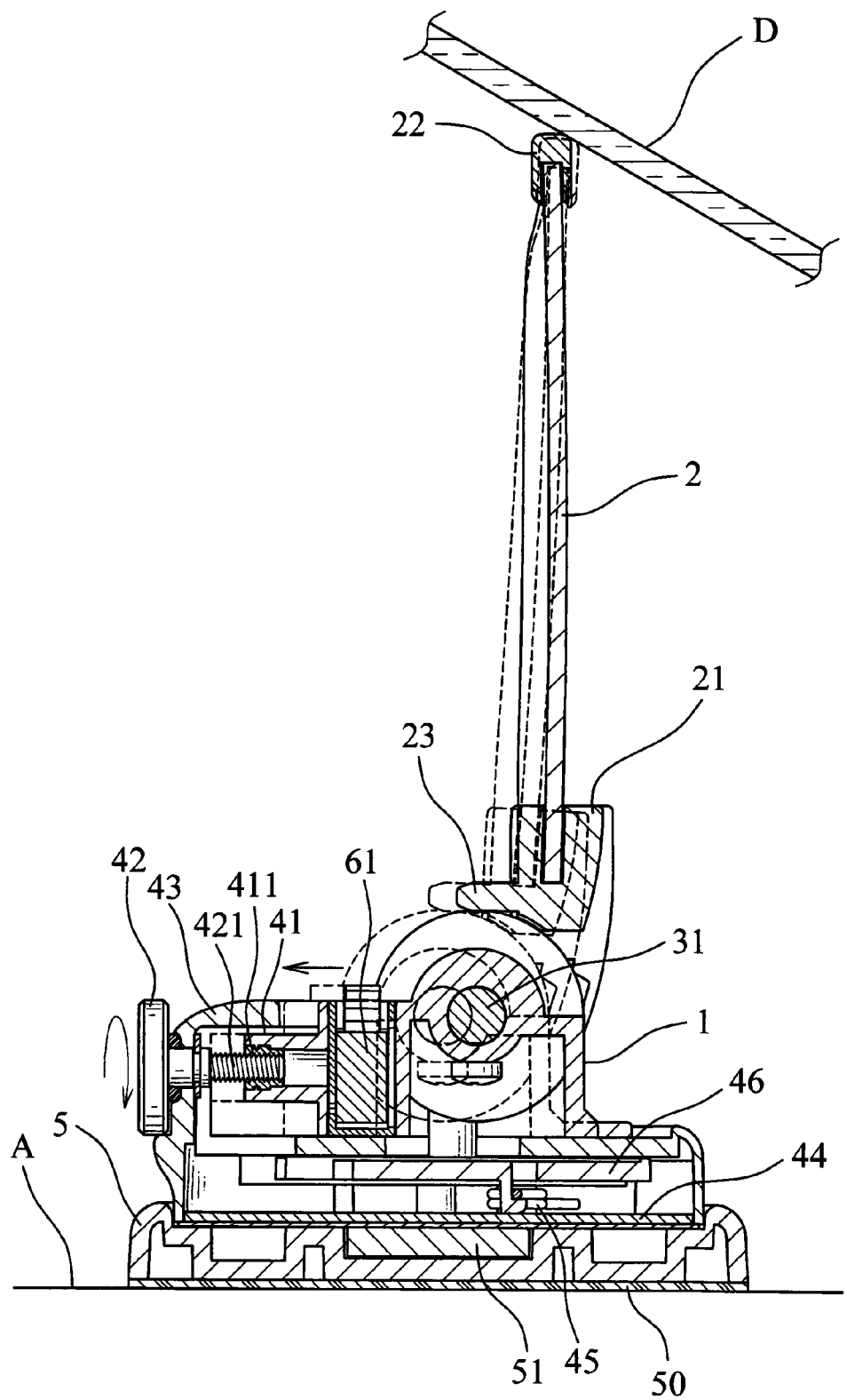
FIG. 5 is a schematic diagram of adjustment of the reflective sheet device of the present invention.

Please refer to FIG. 5, which is a schematic diagram of adjustment of the reflective sheet device of the present invention. In the present invention, in order to let the top end of the reflective sheet 2 steadily touch the windshield D of the vehicle to thereby reduce shakes, to let the user obtain an optimal viewing angle and great viewing quality, appropriate adjustment should be made in the location of the end of the reflective sheet 2 touched to the windshield D of the vehicle.

By rotating the angle adjustment knob 42, the connecting point of the external thread section 421 and the adjustment hole 411 could be changed, so the position of the base 1 is also moved, so that the flipped angle of the reflective sheet 2 and the location that its end touched could be adjusted to let the end of the reflective sheet 2 steadily touched on the windshield D of the vehicle, to effectively reduce shakes.

Figure 6:
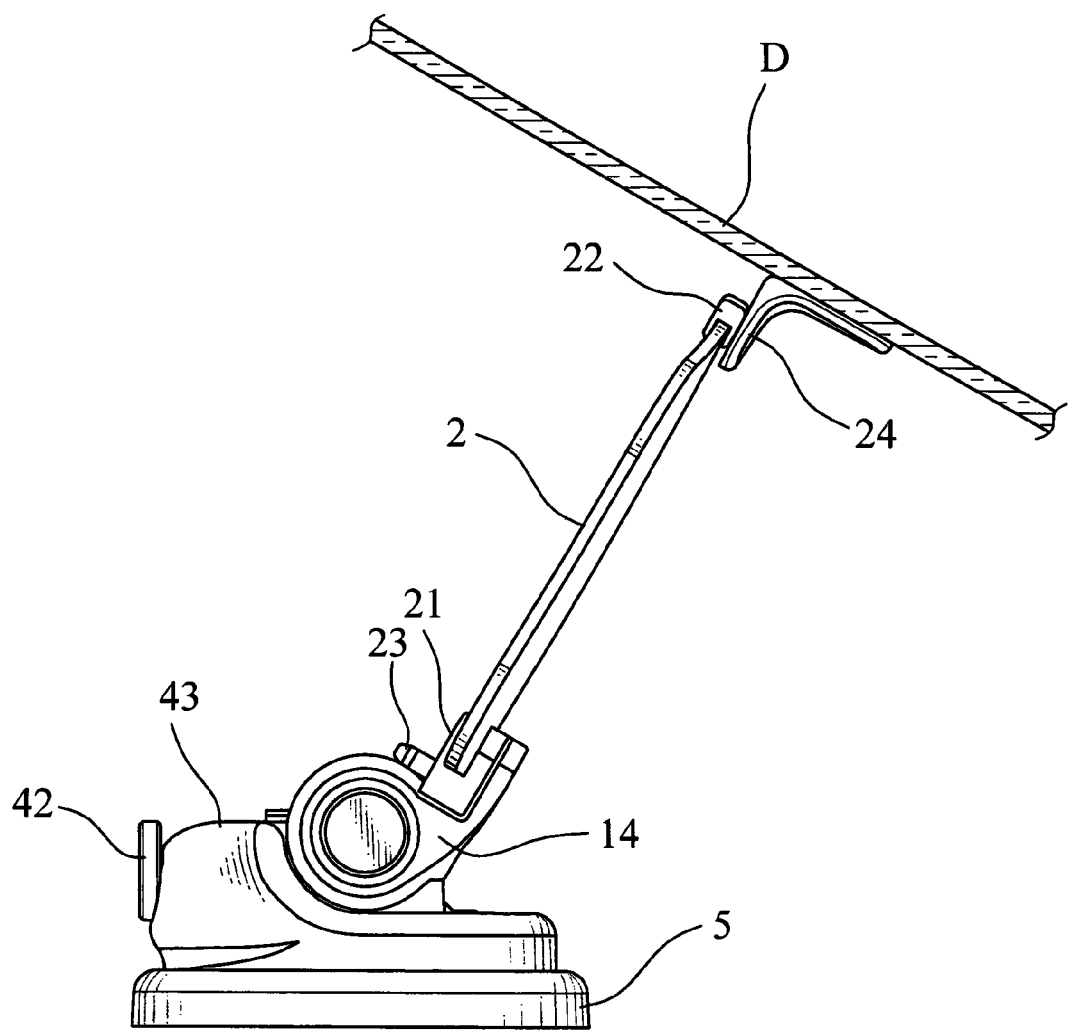
FIG. 6 is a schematic diagram of another embodiment of the present invention.

As shown in FIG. 6, the top-contacted reflective sheet device of the present invention further includes a top-contacted sheet 24, the top-contacted sheet is made of a translucent material, a side of the top-contacted sheet 24 is stuck on the windshield D. By limiting of the top-contacted sheet 24, the reflective sheet 2 could be prevented from flipping and sliding.

What is claimed is:

1. A top-contacted reflective sheet device, including:
a base, a first rotary sleeve is set on a first side of the base;
a reflective sheet, an assembled portion is set on one side of the reflective sheet, the assembled portion is provided to fix to the first rotary sleeve, a top end of the reflective sheet is touched to a windshield;
a shaft group, which is set between the base and the first rotary sleeve; and
an angle adjustment module, the angle adjustment module includes an adjustment block, an angle adjustment knob and a plate, an adjustment hole is set on the adjustment block, the angle adjustment knob is inserted into and threadedly connected to the adjustment hole of the adjustment block, the angle adjustment module is set on a rear portion of the base, when the adjustment knob is rotated, the base is correspondingly moved relative to the plate of the angle adjustment module, to thereby let the top of the reflective sheet be located in the location of touching the windshield after the reflective sheet is flipped.

2. The top-contacted reflective sheet device as claimed in claim 1, further includes a damper, a second fixing hole and a second rotary sleeve are set on a second side of the base, the damper is set between the base and the second rotary sleeve.

3. The top-contacted reflective sheet device as claimed in claim 1, further includes a leveling base, the leveling base is set under an angle adjustment module, a magnetic element is set on the leveling base, a ferromagnetic element is correspondingly set on a bottom of the angle adjustment module.

4. The top-contacted reflective sheet device as claimed in claim 1, further includes an fastening module, an engaging element and an embedded element are set on the fastening module, the engaging element is set on the assembled portion of the reflective sheet, the embedded element is fixed on the base, the engaging element is engaged with the embedded element.

5. The top-contacted reflective sheet device as claimed in claim 1, wherein a damping block is set on the top end of the reflective sheet, shakes of the reflective sheet is reduced due to elastic shock absorption of the damping block.

6. The top-contacted reflective sheet device as claimed in claim 1, wherein a shaft hole is set on the base, a first fixing hole is set on the first side of the base, the shaft group includes a fixed shaft and a first elastic element, the fixed shaft is inserted into the shaft hole, an end of the fixed shaft is fixed into the first fixing hole and slipped on the first rotary sleeve, the first elastic element is slipped on the fixed shaft.

7. The top-contacted reflective sheet device as claimed in claim 1, further includes a top-contacted sheet, a side of the top-contacted sheet is stuck on the windshield.

8. The top-contacted reflective sheet device as claimed in claim 1, further includes top-contacted sheet, the top-contacted sheet is made of a translucent material.

9. A top-contacted reflective sheet device, including:
a base, a first rotary sleeve is set on a first side of the base;
a reflective sheet, an assembled portion is set on one side of the reflective sheet, the assembled portion is provided to fix to the first rotary sleeve, a top end of the reflective sheet is touched to a windshield;
a shaft group, which is set between the base and the first rotary sleeve; and
an angle adjustment module, the adjustment module includes an adjusting plate elastic element, an adjusting plate and a fixed column, the adjusting plate is combined with the base, the adjusting plate elastic element is slipped on the fixed column, a first end of the adjusting plate elastic element engages a plate of the angle adjustment module, and a second end of the adjusting plate elastic element engages the adjusting plate.

10. The top-contacted reflective sheet device as claimed in claim 9, further includes a damper, a second fixing hole and a second rotary sleeve are set on a second side of the base, the damper is set between the base and the second rotary sleeve.

11. The top-contacted reflective sheet device as claimed in claim 9, further includes a leveling base, the leveling base is set under an angle adjustment module, a magnetic element is set on the leveling base, a ferromagnetic element is correspondingly set on a bottom of the angle adjustment module.

12. The top-contacted reflective sheet device as claimed in claim 9, further includes an fastening module, an engaging element and an embedded element are set on the fastening module, the engaging element is set on the assembled portion of the reflective sheet, the embedded element is fixed on the base, the engaging element is engaged with the embedded element.

13. The top-contacted reflective sheet device as claimed in claim 9, wherein a damping block is set on the top end of the reflective sheet, shakes of the reflective sheet is reduced due to elastic shock absorption of the damping block.

14. The top-contacted reflective sheet device as claimed in claim 9, wherein a shaft hole is set on the base, a first fixing hole is set on the first side of the base, the shaft group includes a fixed shaft and a first elastic element, the fixed shaft is inserted into the shaft hole, an end of the fixed shaft is fixed into the first fixing hole and slipped on the first rotary sleeve, the first elastic element is slipped on the fixed shaft.

15. The top-contacted reflective sheet device as claimed in claim 9, further includes a top-contacted sheet, a side of the top-contacted sheet is stuck on the windshield.

16. The top-contacted reflective sheet device as claimed in claim 9, further includes top-contacted sheet, the top-contacted sheet is made of a translucent material.

\* \* \* \* \*